United States Patent

Schähl et al.

[11] Patent Number: 5,690,034
[45] Date of Patent: Nov. 25, 1997

[54] COMPOSITE-MATERIAL PUSH-PULL LINK BAR FOR RAIL VEHICLES

[75] Inventors: Wolfgang Schähl, Henningsdorf; Peter Weichelt, Schönwalde; Ulrich Rudolph, Berlin; Günter Spur, Berlin; Hartmut Mohr, Berlin, all of Germany

[73] Assignee: ABB Daimler-Benz Transportation (Deutschland) GmbH, Henningsdorf, Germany

[21] Appl. No.: 624,501

[22] PCT Filed: Sep. 15, 1994

[86] PCT No.: PCT/DE94/01069

§ 371 Date: Jul. 9, 1996

§ 102(e) Date: Jul. 9, 1996

[87] PCT Pub. No.: WO95/09754

PCT Pub. Date: Apr. 13, 1995

[30] Foreign Application Priority Data

Oct. 6, 1993 [DE] Germany ............... 43 34 629.4
Jun. 28, 1994 [DE] Germany ............... 44 22 579.2

[51] Int. Cl.$^6$ ............................................. B61F 5/50
[52] U.S. Cl. ............................. 105/199.1; 74/579 R
[58] Field of Search ................. 105/176, 199.1; 74/579 R; 428/364, 376

[56] References Cited

U.S. PATENT DOCUMENTS

| | | | |
|---|---|---|---|
| 3,362,252 | 1/1968 | Ditlinger | 74/579 R |
| 4,183,261 | 1/1980 | Eiselbrecher et al. | 74/579 R |
| 4,300,410 | 11/1981 | Raghupathi et al. | 74/579 R |
| 4,414,860 | 11/1983 | Brunsch et al. | 74/579 R |
| 4,665,834 | 5/1987 | Van Iperen | 105/4.1 |
| 4,841,801 | 6/1989 | Tice | 74/573 R |

FOREIGN PATENT DOCUMENTS

| | | |
|---|---|---|
| 0032162 | 7/1981 | European Pat. Off. |
| 32051 | 7/1981 | European Pat. Off. |
| 0052993 | 6/1982 | European Pat. Off. |
| 0174468 | 3/1986 | European Pat. Off. |
| 0409123 | 1/1991 | European Pat. Off. |
| 27215 | 11/1964 | German Dem. Rep. |
| 2929927 | 1/1981 | Germany. |
| 2951111 | 7/1981 | Germany. |
| 3835033 | 4/1990 | Germany. |

Primary Examiner—S. Joseph Morano
Attorney, Agent, or Firm—Spencer & Frank

[57] ABSTRACT

A composite push-pull bar for use in a rail vehicle includes end-side connecting elements for axial introduction of compressive and tractive forces; and a rod-shaped structural element disposed between the end-side connecting elements for take-up and transmission of compressive and tractive forces. The rod-shaped element comprises a longitudinally extending core, a prestressed composite winding, including a defined number of wrappings of one or several reinforcing fibers embedded in a cured matrix material, applied in a longitudinal direction of the core so as to leave opposite longitudinal sides of the core not covered by the winding, the winding extending over the connecting elements and two skins arranged on the opposite longitudinal sides of the core not covered by the winding to form a sandwich structure with the core and which remain rigid under compression in their longitudinal direction.

10 Claims, 3 Drawing Sheets

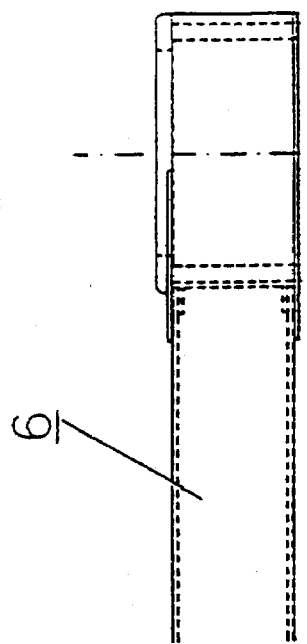
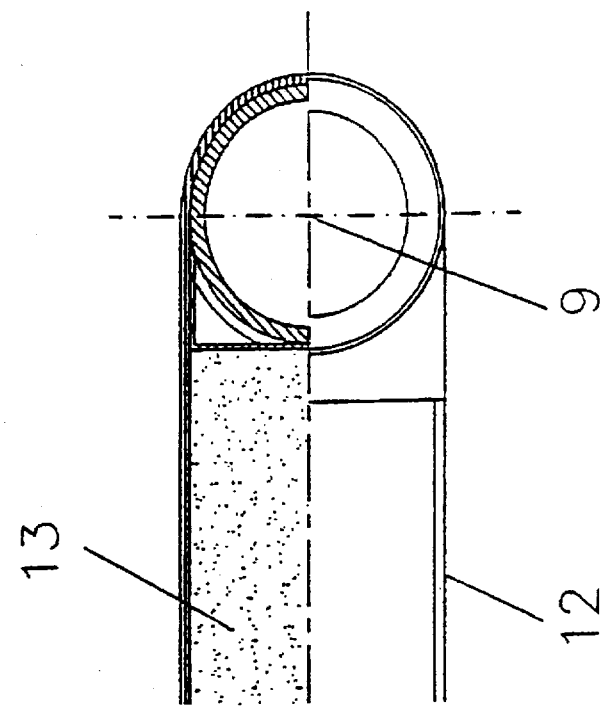
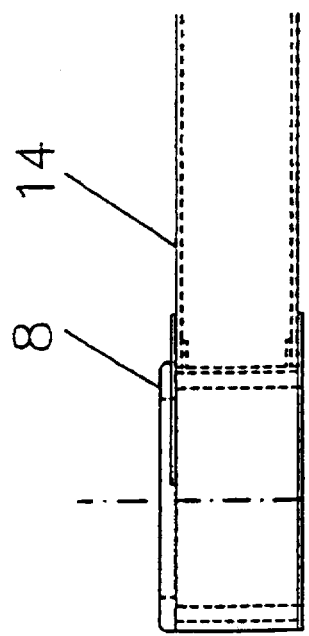
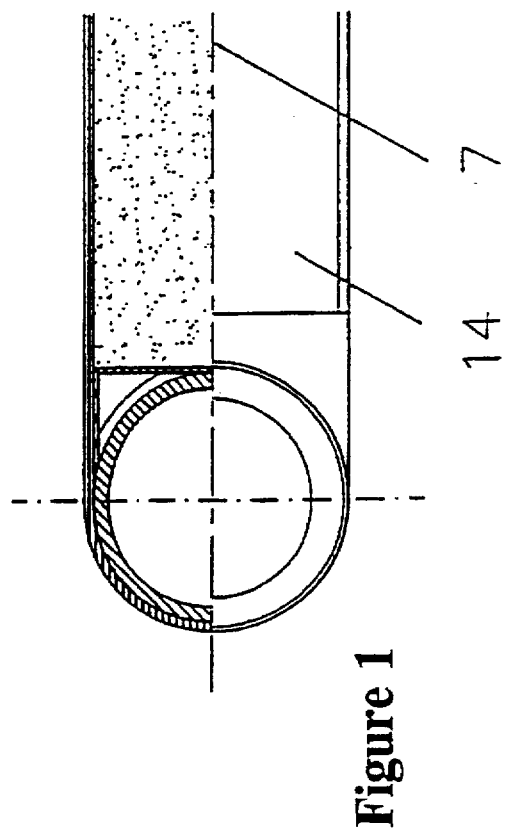
Figure 1a
Figure 1

COMPOSITE-MATERIAL PUSH-PULL LINK BAR FOR RAIL VEHICLES

BACKGROUND OF THE INVENTION

The invention relates to a composite push-pull bar for use in a rail vehicle, comprising: end-side connecting elements for axial introduction of compressive and tractive forces; and a rod-shaped structural element disposed between the end-side connecting elements for take-up and transmission of the compressive and tractive forces, the rod-shaped element comprising a longitudinally extending core and a prestressed composite winding, including a defined number of wrappings of one or several reinforcing fibers embedded in a cured matrix material, applied in a longitudinal direction of the core and extending over the connecting elements.

In motive-power rail vehicles, push-pull bars serve, e.g., to articulate the bogie to the vehicle body of the motive-power rail vehicle, with the vehicle body having a false pivot, in order to transmit the tractive and braking forces occurring during operation.

Such push-pull bars must withstand very high loads resulting from tractive and braking forces, short-term static and dynamic loads of the bogie of up to 5 g without being damaged. During operation, the push-pull bar is subject to radial and cardanic excursions between bogie and vehicle body during the negotiation of curves, when travelling on inclines as well as resulting from galloping and rolling of the bogie. These excursions are taken into account by way of end-side link joints of the push-pull bar.

It is known from German Patent DE 29 29 927 C2 to make such push-pull bars predominantly from metallic materials. In a frequently used design, a connecting bar is provided at its ends with flange-mounted joint members. These joint members embrace guiding pins which are form-fittingly secured to members of the vehicle body and to the bogie and which are, e.g., made of cast steel, and the joint members are connected to the guiding pins via a pivot bearing. In order to reduce impulses between bogie and vehicle body during start-up and braking processes, the articulation must take place by way of an elastic connection. Since the connecting bar itself is rigid, the pivot bearing is frequently configured as an elastomeric member which, on the outside and the inside, is vulcanized together with one guide bush each.

One problem of this solution is that strength-increasing and stability-increasing measures that are necessary to increase the performance of the motive-power rail vehicle result in a mass increase at the push-pull bars, thus having a negative impact on the overall mass balance of the vehicle. It is desirable, however, to reduce the mass, if possible. Another problem is that only a very limited installation height is available for the dimensioning of such a reinforced push-pull bar and for its installation. Furthermore, it is a drawback that the elastomeric members of the conventional joints, which are provided with a defined elasticity, change their properties due to environmental influences, oil, cleaning agents and oxidation. Other stable joint members such as, radial bearings, cannot be employed because they reduce the elasticity of the connection between bogie and vehicle body in a disadvantageous manner. A high elasticity of this articulation between vehicle body and bogie, however, is desirable because therewith the inducement of bending vibrations in the vehicle body can be reduced, the resulting vertical accelerations and the dynamic load on the members in the vehicle body can be reduced, and the riding comfort in the engineer's cab can be increased.

The approach for the solution to this problem is the attempt to design a push-pull bar made of composite fiber materials.

In German Patent document DE 29 51 111 A1, a composite member is described as a connecting rod for internal combustion engines, wherein a connecting rod shaft is disposed between two bearing eyes. A strap made of synthetic resin-impregnated fiber strands is placed around this arrangement. The connecting rod shaft is comprised of two U-shaped sections whose backs are facing one another and which are compression-molded from fiber-reinforced plastic and into each of which a core made of the same material is inserted longitudinally. The entire arrangement is enclosed by synthetic resin-impregnated fiber layers wound perpendicularly to the longitudinal axis. In this shaft configuration, the cores serve to take up the compression loads, the strap serves to take up the tractive forces and the U-shaped sections together with the transversely applied winding serve as shearing combination for taking up the bending load of the connecting rod. Because of their strength and modulus of elasticity, particularly carbon fibers, but also glass or plastic, should be used as fibers.

But the introduction of forces and the load conditions for a connecting rod of an engine deviate considerably from the described application of a push-pull rod for motive-power rail vehicles, which means that it cannot be contemplated to simply transfer the design and to dimension this known composite member to be higher.

SUMMARY OF THE INVENTION

It is an object of the invention to provide a design solution for a composite member of the type mentioned at the outset which meets the demands placed upon a push-pull bar, which can transmit the tractive and braking forces between the bogie of a motive-power rail vehicle and its vehicle body and is provided with a defined elasticity and which can be manufactured by a simple process.

This object is solved according to the invention by the provision of a composite push-pull bar for use in a rail vehicle, comprising: end-side connecting elements for axial introduction of compressive and tractive forces; and a rod-shaped structural element disposed between the end-side connecting elements for take-up and transmission of the compressive and tractive forces, the rod-shaped element comprising: a longitudinally extending core; a prestressed composite winding, including a defined number of wrappings of one or several reinforcing fibers embedded in a cured matrix material, applied in a longitudinal direction of the core so as to leave opposite longitudinal sides of the core not covered by the winding, the winding extending over the connecting elements; and two skins arranged on the opposite longitudinal sides of the core not covered by the winding to form a sandwich structure with the core and which remain rigid under compression in their longitudinal direction.

BRIEF DESCRIPTION OF THE DRAWINGS

The invention is depicted in the drawings by way of example and described in detail in the text below. The drawings show:

FIG. 1 is a plan view in partial section of a composite member according to the invention.

FIG. 1a is a side view of FIG. 1.

FIG. 2 is a sectional view of an end portion of the side view of the enlarged composite member according to FIG. 1a.

DETAILED DESCRIPTION OF THE INVENTION

Figure 2:
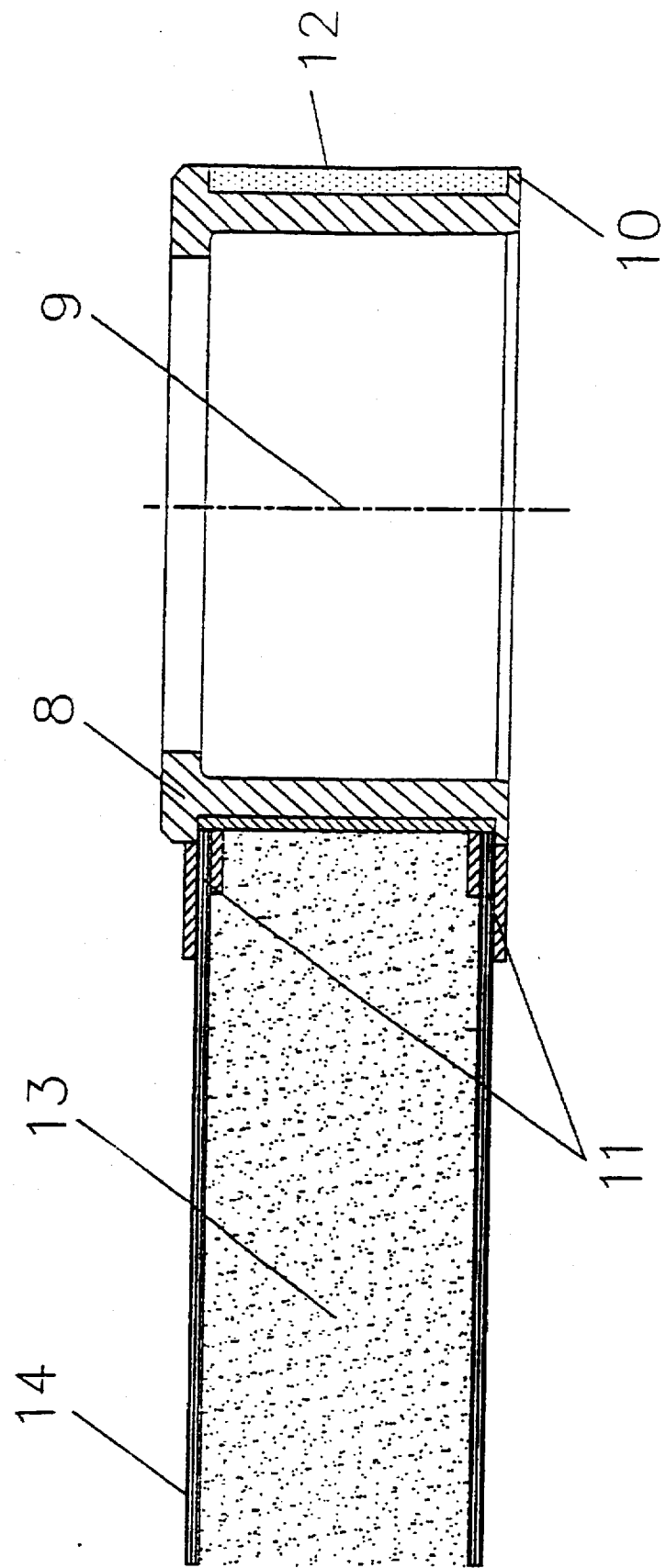
Figure 3:
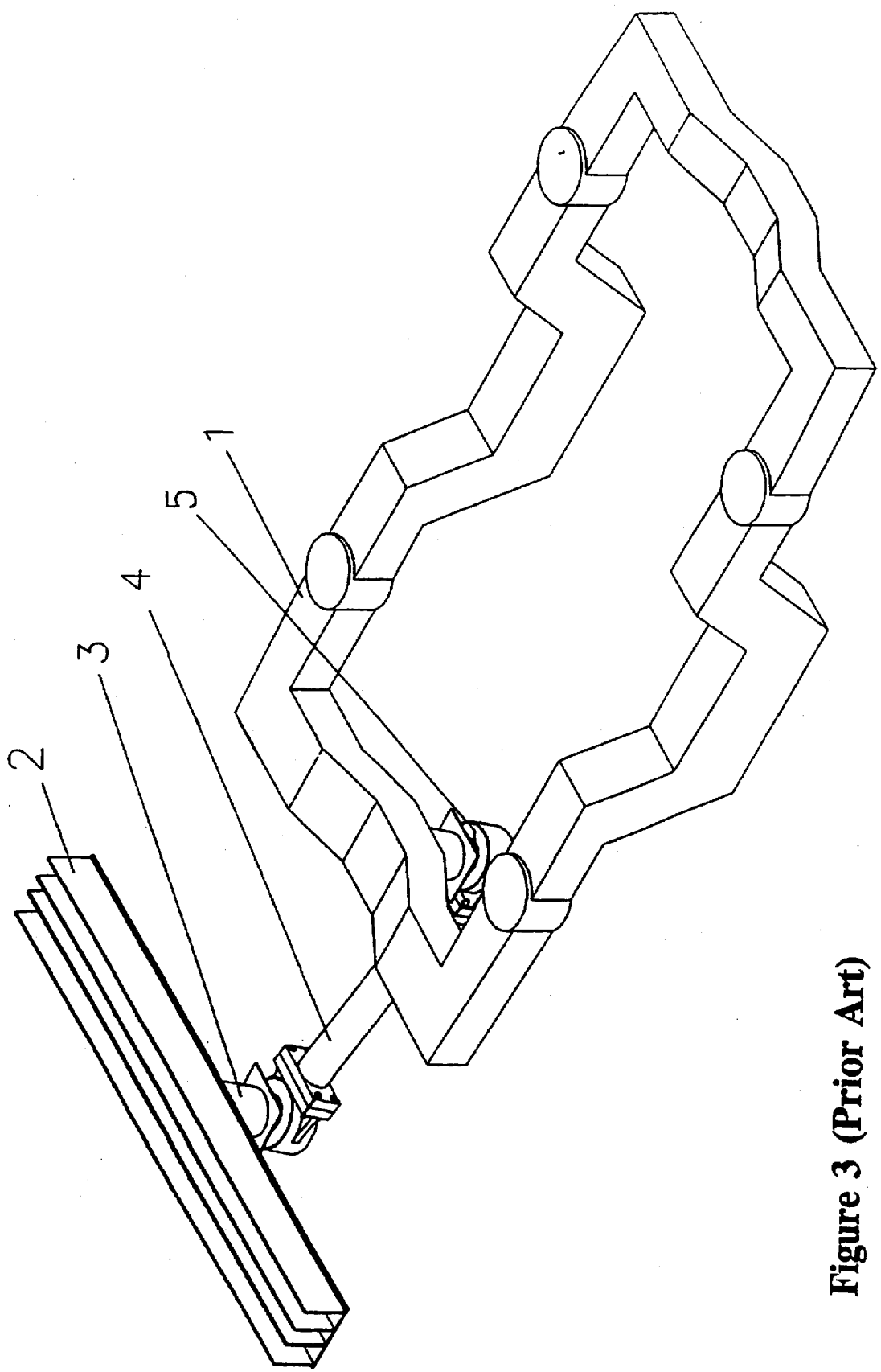
FIG. 3 is as a comparison, a push-pull bar of conventional design as well as the installation position of a push-pull bar in a motive-power rail vehicle.

In the embodiment of a composite member having the design of the invention shown in FIGS. 1, 1a and 2, a rod-shaped structural element 7 takes up the compressive forces carried off by the connecting elements 8 from bogie frame 1 FIG.3 and transverse vehicle body beam 2, and a composite fiber winding 12, which is wound around the entire composite member 6, takes up the tractive forces.

On the face side of the structural element 7, there are arranged metallic connecting elements 8 having a rounded head which are provided with a force introduction eye 9 for the later mounting of joint members. This construction makes it possible to clamp the force introduction eyes securely into an assembling and winding device and to precisely calibrate their axial distance from one another.

The rod-shaped structural element 7 which takes up the compressive forces from the connecting elements 8 is formed by a sandwich structure put together from a core 13 and two skins 14 remaining rigid under compression. According to the embodiment, the core 13 with a rectangular cross section is comprised of rigid foam. The skins 14, which remain rigid under compression in their longitudinal direction, are made from unidirectional glass fibers which are embedded in a cured synthetic resin matrix and which are parallel with respect to their axes; the skins are bonded under pressure onto two longitudinal sides of the core 13 disposed opposite of one another. These skins 14 may be cut to size from preliminary material or they may be put together from prepregs, be consolidated in autoclaves and solidified and then cut.

The compressive forces are introduced into the composite member 6 via the contact surfaces arranged perpendicularly to its longitudinal axis between the core 13 and the skins 14, which remain rigid under compression in the longitudinal direction, by means of the connecting elements 8. To reduce the risk of buckling, the skins 14 are form-fittingly surrounded on two sides in the force admission region by a U-shaped supporting groove 11 of the connecting elements 8, and thus they are supported to prevent buckling.

Depending on the load conditions, the core 13 may also be made of different materials such as rigid foam, a honeycomb material, thermoplastic molded parts, pressed or pultruded sections, a unidirectional or multi-directional monofiber or hybrid fiber composite structure or of wood.

A composite fiber winding 12 comprised of a defined number of resin-impregnated glass roving threads is wound in the axial direction around the formation of rod-shaped structural element 7 and end-side connecting elements 8, which glass roving threads extend along the longitudinal sides of the core 13 not covered by the skins 14 remaining rigid under shear and which glass roving threads, after wrapping, were cold press-molded onto the core 13, cured and then tempered while exposed to heat. This composite fiber winding takes up the tractive forces introduced into the push-pull bar 4. The number of windings of the glass roving threads is determined by the greatest tractive load to be taken up. The initial tension during winding is selected such that the glass roving threads remain under tensile load even under the greatest compression load of the push-pull bar 4 and the greatest heat expansion within the composite fiber winding 12.

In order to ensure that the windings of the composite fiber winding cannot slide or creep down from the head of the connecting elements 8 on the side, both during manufacture and under load, they are provided at the edges with a lateral shoulder 10.

In order to further reduce the mass while the same stability is maintained, materials such as carbon or aramide fibers can be used (individually or in the hybrid composite, unidirectional or multidirectional) instead of glass fibers for both the skins 14 and for the composite fiber winding 12. A thermoplastic matrix material may also be used instead of a synthetic resin matrix.

If, for its articulation to guiding pins 3, the composite member 6 as a push-pull bar 4 would be fitted in its joints 5 with joint members of conventional design described at the outset, the dimensioning of the rod-shaped structural element 7 and of the composite fiber winding 12 would have to take into account that, in the event of a cardanic excursion between bogie frame 1 and transverse vehicle body beam 2, the elastomeric members inserted into the joints 5 would be deformed, which would result in a torque load that would attempt to twist and/or bend the push-pull bar 4.

But the longitudinal elasticity inherent in the composite member according to the invention makes it possible to arrange radial pivot bearings in the force introduction eye 9 of the connecting element 8 so that an almost torque-free load of the composite member 6 can be accomplished, which load is only comprised of axial forces, and an optimum dimensioning of the composite member with respect to space requirement and mass can be realized, with the maintenance-free radial pivot bearings not being subject to the property changes due to soiling and wear as is the case for the elastomeric parts of conventional bearings.

Studies have confirmed that the longitudinal elasticity inherent in the composite member 6 has a noticeable influence on the change of the vibration behavior and of the running performance of a motive-power rail vehicle. The rigidity of the composite member 6, which is reduced considerably compared to conventional push-pull bars made of metallic materials, reduces the bending vibrations induced in the vehicle body of the motive-power rail vehicle such that vertical accelerations acting in the vehicle body are reduced, smaller dynamic loads act on the assemblies and members housed in the vehicle body, and the riding comfort in the engineer's cab of the motive-power rail vehicle is improved considerably.

In certain applications it might be advisable to increase the shear rigidity of the composite member 6 by applying an additional covering (not shown in the drawings) over at least a portion of the length of the rod-shaped structural element 7. This covering may be comprised, e.g., of a resin-impregnated fabric tube or a wrapping (known per se) applied perpendicularly to the longitudinal axis, which wrapping is made of resin-impregnated reinforcing fibers that are subsequently pressed and cured. For protection against environmental influences and mechanical damage, it might be necessary to apply an additional covering or coating (e.g., made of a highly damping elastomer; not shown in the Figures) on the composite member 6. To improve the fire behavior, it is advisable for the covering or coating to be impregnated with suitable flame-resistant resin systems, preferably phenolic resin.

It is also conceivable that the composite member of the type described is used in other applications, particularly in rail vehicles where the elastic transmission of tractive and compressive forces is required.

We claim:

1. A composite push-pull bar for use in a rail vehicle, comprising:

end-side connecting elements for axial introduction of compressive and tractive forces; and a rod-shaped structural element disposed between the end-side connecting elements for take-up and transmission of the compressive and tractive forces, the rod-shaped element comprising:

a longitudinally extending core;

a prestressed composite winding, including a defined number of wrappings of one or several reinforcing fibers embedded in a cured matrix material, applied in a longitudinal direction of the core so as to leave opposite longitudinal sides of the core not covered by the winding, the winding extending over the connecting elements; and two skins arranged on the opposite longitudinal sides of the core not covered by the winding to form a sandwich structure with the core and which remain rigid under compression in their longitudinal direction.

2. The composite member according to claim 1, wherein the core comprises one of a rigid foam; a honeycomb material; thermoplastic molded parts; pressed or pultruded sections; a unidirectional or multidirectional monofiber or hybrid fiber composite structure; and wood.

3. The composite member according to claim 1, wherein the skins are comprised of reinforcing fibers arranged unidirectionally and parallel with respect to their axes, are embedded in a cured matrix material, and are bonded to the core.

4. The composite member according to claim 1, wherein the core and skins have axial end faces and the connecting elements are supported against the axial end faces of the core and skins for the transmission of compressive forces into the rod-shaped element.

5. The composite member according to claim 4, wherein the connecting elements include means defining a slot shaped supporting groove into which a force introduction region of the skins is form-fittingly embraced.

6. The composite member according to claim 1, wherein the core has a longitudinal axis and the connecting elements each include a bearing eye disposed transversely to the longitudinal axis, the bearing eye being adapted for receiving a pressed in rubber pivot bearing or radial pivot bearing.

7. The composite member according to claim 1, wherein the rod-shaped structural element includes an additional outer covering for increasing its compressive stability.

8. The composite member according to claim 1, wherein the rod-shaped structural element includes a tube-shaped or layer-shaped protection that is effective against environmental influences and damage.

9. The composite member according to claim 8, wherein the tube-shaped or layer-shaped protection is impact resistant.

10. The composite member according to claim 8, wherein the tube-shaped or layer-shaped protection is flame retardant.

* * * * *